UNITED STATES PATENT OFFICE.

FRIEDRICH STOLZ AND GEORG KORNDÖRFER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ALKAMIN ESTER.

No. 828,071.  Specification of Letters Patent.  Patented Aug. 7, 1906.

Application filed November 29, 1905. Serial No. 289,634.

*To all whom it may concern:*

Be it known that we, FRIEDRICH STOLZ, Ph. D., and GEORG KORNDÖRFER, Ph. D., chemists, citizens of the Empire of Germany, residing at Höchst-on-the-Main, Germany, have invented new Pharmaceutical Products; and we hereby declare the following to be a specification thereof.

The new pharmaceutical products are the esters of meta-aminobenzoic acid, which are decomposed by heating with acids or alkalies into meta-aminobenzoic acid and an alkamin derivating from an aminoalcohol the carbon atoms of which are linked in an open chain. These alkamin esters of the meta-aminobenzoic acid may be obtained by several methods. We prefer to synthetize them by reducing the corresponding meta-nitrobenzoic-acid alkamin ester. The new aminobenzoic-acid alkamin esters are colorless compounds little soluble in water, but readily soluble in alcohol, ether, and benzene, of a low melting-point, and of alkaline reaction on litmus. Most characteristic is their decomposition when heated with alkalies or acids, as they form then meta-aminobenzoic acid and an alkamin, deriving from an aminoalcohol with an open carbon chain. With hydrochloric acid said esters form salts readily soluble in water to a neutral solution. The new esters have the property of producing local anæsthesia, and this property is in their neutral reacting hydrochlorids not associated with any irritating effect.

The preparation of such an ester may occur, for instance, as follows: ten parts, by weight, of meta-nitrobenzoyldiethylaminoethanol, which may be obtained by heating meta-nitrobenzoylchlorid with diethyl-aminoethanol in presence of benzene, and which is an oil soluble with difficulty in water, are dissolved in twenty-five parts, by weight, of concentrated hydrochloric acid, to which are added twelve parts, by weight, of tin, the reaction being allowed to take place at a moderate temperature. From the dilute solution the tin is then eliminated by means of hydrogen sulfid, and after filtration the meta-aminobenzoyldiethylaminoethanol on addition of sodium carbonate may be precipitated and separated by shaking with ether. On evaporating the ethereal solution the new compound remains as an oil which solidifies and may be recrystallized from ligroin, then forming crystals having the melting-point 45° to 47° centigrade. It is soluble in water with difficulty, but readily soluble in ether, alcohol, and benzene. On heating with alkalies or acids the ester is decomposed, forming meta-aminobenzoic acid and diethylaminoethanol. With one equivalent of hydrochloric acid it forms a hydrochlorid readily soluble in water to a neutral reaction and crystallizing from alcohol in prisms, melting at 118° to 120° centigrade.

In an analogous or different manner other alkamin esters of meta-aminobenzoic acid may be obtained showing the above-mentioned characteristics.

Having now described our invention, what we claim is—

1. As new products, those alkamin esters of meta-aminobenzoic acid which yield, when heated with acids or alkalies, meta-aminobenzoic acid and an alkamin derivating from an aminoalcohol with an open chain of carbon atoms; the new esters being colorless compounds, little soluble in water, readily soluble in alcohol, ether and benzene, of alkalin reaction on litmus, forming with hydrochloric acid salts soluble to a neutral solution, which produce local anæsthesia without causing any irritation.

2. As a new product, the alkamin ester, meta-aminobenzoyldiethylaminoethanol, being a colorless compound little soluble in water, readily soluble in alcohol, ether and benzene, solidifying in the cold and melting at 45° to 47° centigrade, of alkaline reaction on litmus and when heated with hydrochloric acid or soda-lye it is decomposed into meta-aminobenzoic acid and diethylaminoethanol, forming a salt with one equivalent of hydrochloric acid which crystallizes from alcohol in prisms melting at 118° to 120° centigrade, the solution of which is of anesthetic action without causing irritation.

In testimony that we claim the foregoing as our invention we have signed our names in presence of two subscribing witnesses.

FRIEDRICH STOLZ.
GEORG KORNDÖRFER.

Witnesses:
JEAN GRUND,
CARL GRUND.